United States Patent
Stennett et al.

(10) Patent No.: US 12,499,444 B1
(45) Date of Patent: Dec. 16, 2025

(54) CROSS-PLATFORM SYSTEM FOR SECURE DIGITAL TRANSACTIONS USING INTEGRATED PASSKEYS, USER DATA TOKENS AND CRYPTOGRAPHIC BINDING

(71) Applicant: NULLITI CORPORATION, Frisco, TX (US)

(72) Inventors: Matt Stennett, Frisco, TX (US); Donald E. Paris, Frisco, TX (US); Robert Alpert, Frisco, TX (US); Julien Fleury, Frisco, TX (US)

(73) Assignee: NULLITI CORPORATION, Frisco, TX (US)

( * ) Notice: Subject to any disclaimer, the term of this patent is extended or adjusted under 35 U.S.C. 154(b) by 0 days.

(21) Appl. No.: 19/061,788

(22) Filed: Feb. 24, 2025

(51) Int. Cl.
*G06Q 20/40* (2012.01)

(52) U.S. Cl.
CPC ................... *G06Q 20/401* (2013.01)

(58) Field of Classification Search
CPC ....................................................... G06Q 20/401
See application file for complete search history.

(56) References Cited

U.S. PATENT DOCUMENTS

| | | | |
|---|---|---|---|
| 9,760,871 B1 * | 9/2017 | Pourfallah | G06Q 10/10 |
| 10,628,833 B2 | 4/2020 | Hines | |
| 11,308,487 B1 | 4/2022 | Foster et al. | |
| 11,757,640 B2 | 9/2023 | Ferenczi | |
| 11,907,939 B2 | 2/2024 | Cramer | |
| 12,073,409 B2 | 8/2024 | Asefi et al. | |
| 12,165,141 B1 * | 12/2024 | Griffin | H04L 9/3231 |
| 2012/0239578 A1 | 9/2012 | Kang et al. | |
| 2015/0032627 A1 * | 1/2015 | Dill | G06Q 20/40 705/44 |
| 2015/0067341 A1 * | 3/2015 | Deen | H04L 63/123 713/176 |
| 2016/0140545 A1 * | 5/2016 | Flurscheim | H04L 9/3234 705/76 |
| 2019/0197527 A1 * | 6/2019 | Agarwalla | G06Q 20/3676 |
| 2020/0294033 A1 * | 9/2020 | Wilson | G06Q 20/0658 |
| 2023/0342776 A1 * | 10/2023 | O'Kane | G06Q 20/204 |
| 2024/0106649 A1 | 3/2024 | Berry et al. | |

* cited by examiner

*Primary Examiner* — Raven E Yono
(74) *Attorney, Agent, or Firm* — David R. Heckadon; Gordon Rees Scully Mansukhani LLP

(57) ABSTRACT

A computer platform for securely performing an electronic purchase transaction, including: a user interface for receiving payment card data; a token generator configured for generating a payment card token corresponding to the payment card data; a passkey generator; a cryptographic binding system configured for cryptographically binding the payment card token to the passkey; and a payment processing system configured for sending the payment card data to a merchant after the user has used the passkey to unlock the payment card data in the payment card token.

21 Claims, 6 Drawing Sheets

CROSS-PLATFORM SYSTEM FOR SECURE DIGITAL TRANSACTIONS USING INTEGRATED PASSKEYS, USER DATA TOKENS AND CRYPTOGRAPHIC BINDING

TECHNICAL FIELD

The present invention relates to computer platforms and architectures that improve electronic purchasing data transaction security.

BACKGROUND OF THE INVENTION

Online security is a paramount concern in today's world. Security is particularly important when purchasing goods or services online. Specifically, billing and shipping information is necessary to complete online purchases but is also information which should remain confidential and closely guarded.

In the digital transaction landscape, the handling of sensitive billing and shipping information (including but not limited to credit card details and transaction histories) is very important. In addition, the user experience when purchasing these goods or services online is also very important. In the past, these competing demands have required making undesirable trade-offs. What is instead desired is a computer architecture that offers a convenient, easy to use interface and experience for the customer, yet also guards the security of the customer's personal information and credit card information.

In addition, traditional payment authentication systems have tended to focus on securing payment card details, while address and shipping information was treated separately and less securely. What is instead required is a unified and secure computer architecture that simultaneously protects the confidentiality of payment card details, address and shipping information and any other user-specific information (such as purchase history, user preferences, transaction history, etc.) throughout the entire transaction process.

SUMMARY OF THE INVENTION

As will be explained, the present computer architecture integrates cardholder identity verification, tokenized billing and shipping information, credit card network tokens and user-specific data and transaction history into a unified, secure framework for secure digital transactions. One advantage of the present system is that it can be operated seamlessly across different platforms and computer systems.

As will be shown the present system improves computer operation and functionality to provide a seamless cross-platform experience. The present system also ensures that all sensitive transaction data is protected, while reducing friction for the user. By using tokenization and passkey-based identity verification, the present system and method reduces the need for repetitive authentication steps and simplifies the entire transaction process.

In preferred aspects, the present system first creates a unique user data token. This user data token preferably contains both sensitive purchasing information, and also user personal data, as desired. This user data token is then tied to the user's passkey. This advantageously ensures that only the passkey holder can access the sensitive data stored in the user data token. Preferably, the user data token is cryptographically bound to the user's passkey. The advantage of this approach is that it provides cross-platform functionality and interoperability. In short, the user's specific data (which may include billing and shipping information, loyalty programs and other user-specific information, including but not limited to user preferences and purchase and transaction history) is protected securely across different devices and across different operating systems.

In preferred aspects, the present system includes a method of securely performing an electronic purchase transaction, by:

(a) cryptographically binding a payment card token to a passkey by:

having a user send payment card data into a computer processing system;

having the computer processing system generate a payment card token corresponding to the payment card data;

having the user generate a passkey that is sent into the computer processing system;

having the computer processing system cryptographically bind the payment card token to the passkey; and then (b) completing an electronic purchase transaction by:

having the user request the payment card token from the computer processing system;

having the user unlock the payment card token with the passkey; and then having the computer processing system send the payment card data to a merchant to complete the electronic purchase transaction.

In optional preferred aspects, the present system further increases computer processing speed and operation by distinguishing between existing users and new users. Specifically, the present system recognizes existing users by quickly determining if the payment card token has previously been stored within the computer processing system. If the payment card token has indeed previously been stored in the computer processing system, then the step of generating the payment token and passkey is skipped. Instead, the payment token is sent directly to the user/customer, and they then unlock this token with their existing passkey. Once the token has been unlocked, its payment card data is then used to complete the electronic payment transaction. In optional aspects, in the case of a new user/customer, the present system may provide added security by requesting an identity challenge from an issuing bank associated with the payment card data, and then wait to receive approved results of the identity challenge from the issuing bank, prior to generating the payment card token. Identity challenges may also include or use SMS text messages, as desired.

In further optional aspects, the present system may generate additional tokens (which are also cryptographically bound to the user's passkey). For example, shipping and billing data may be used to generate a shipping token (which can be unlocked by the user's passkey), and/or user-specific data may be used to generate a user-specific token (which can also be unlocked by the user's passkey). Such user-specific data may optionally include loyalty program data, personal details, preferences, and behavioral data.

In preferred embodiments, the user generates the passkey by completing an identification challenge sent by the computer processing system, and the passkey itself comprises a public portion generated by the computer processing system and a private portion generated by the user with input from the computer processing system. Most preferably, this passkey can be generated using the user's biometric data or by using secure hardware data bound to the user's device.

In alternate aspects, the present computer architecture comprises a computer platform for securely performing an electronic purchase transaction, including:
  a cloud processing engine;
  a user interface configured for a user to send payment card data to the cloud processing engine;
  a token generator in communication with the cloud processing engine, wherein the token generator is configured for generating a payment card token corresponding to the payment card data;
  a passkey generator in communication with the cloud processing engine, wherein the passkey generator is configured for generating a request for passkey generation that is sent to the user such that the user responds to the request for passkey generation by generating a passkey;
  a cryptographic binding system in communication with the cloud processing engine, wherein the cryptographic binding system is configured for cryptographically binding the payment card token to the passkey; and
  a payment processing system in communication with the cloud processing engine, wherein the payment processing system is configured for sending the payment card data to the merchant to complete the electronic purchase transaction after the user has used the passkey to unlock the payment card data in the payment card token.

In further optional embodiments, the present system also includes:
  an identity system in communication with the cloud processing engine, wherein the identity system is configured for requesting an identity challenge from an issuing bank associated with the payment card data prior to generating the payment card token; and
  an encryption system in communication with the cloud processing engine, wherein the encryption system is configured for encrypting the payment card data prior to the token generator generating the payment card token.

In optional embodiments, the user interface may be resident in displayed or presented on a point of sale terminal in a store, including a cash register, a check in counter, a hand-held mobile device, etc., without limitation.

In other optional aspects, the step of having the user request the payment token from the computer processing system is performed by:
  (i) having the computer processing system identify the user at a point-of-sale location,
  (ii) having the user select a product at the point-of-sale location,
  (iii) having the computer processing system associate the product with the user; and then
  (iv) having the computer processing system send the payment card token to the user for the user to unlock with the passkey.

The computer may identify the user at a point-of-sale location (for example, a retail store), using a proximity detection system such as a GPS, Bluetooth beacon, Near Field Communication system, etc. The user may select a product that (s)he wishes to purchase and present it to a salesperson (or to a sale's terminal). The present system can then link the product to the user and then automatically send the payment card token to the user for the user to unlock with their passkey. The advantage of this approach is that the user's identity can be determined without the user having to enter their credit card info, password, or phone number into a point-of-sale machine such as a cash register or terminal.

In contrast, traditional digital wallets require customers to manually scan items or interact with a checkout terminal, which can slow down transactions and introduce friction in the payment process.

Additionally, current systems rely heavily on NFC, QR codes, or manual payment authentication, limiting automation and efficiency. In contrast, the present system has no need for Tap, Dip or manual card entry, PINs, or cash transactions. It also works in any retail environment, including supermarkets, fashion stores, and quick-service restaurants and drive throughs.

The present system optionally uses an Artificial Intelligence powered identification system that detects and assigns a user/customer ID based on GPS, Bluetooth, or NFC proximity data. In short, the user/customer simply identifies the product they wish to purchase and the present system identifies the user. The present invention enables a seamless, AI-driven in-store payment system, reducing checkout friction while enhancing security. By integrating passkey authentication, AI-powered identity detection, and salesperson-assisted checkout, the system ensures fast, secure, and automated payments in retail environments. The present system can work with various point-of-sale machines including computer terminals, cash registers, card payment terminals, smartphones, computer tablets or a hand-held scanners.

DETAILED DESCRIPTION OF THE DRAWINGS

Figure 1:
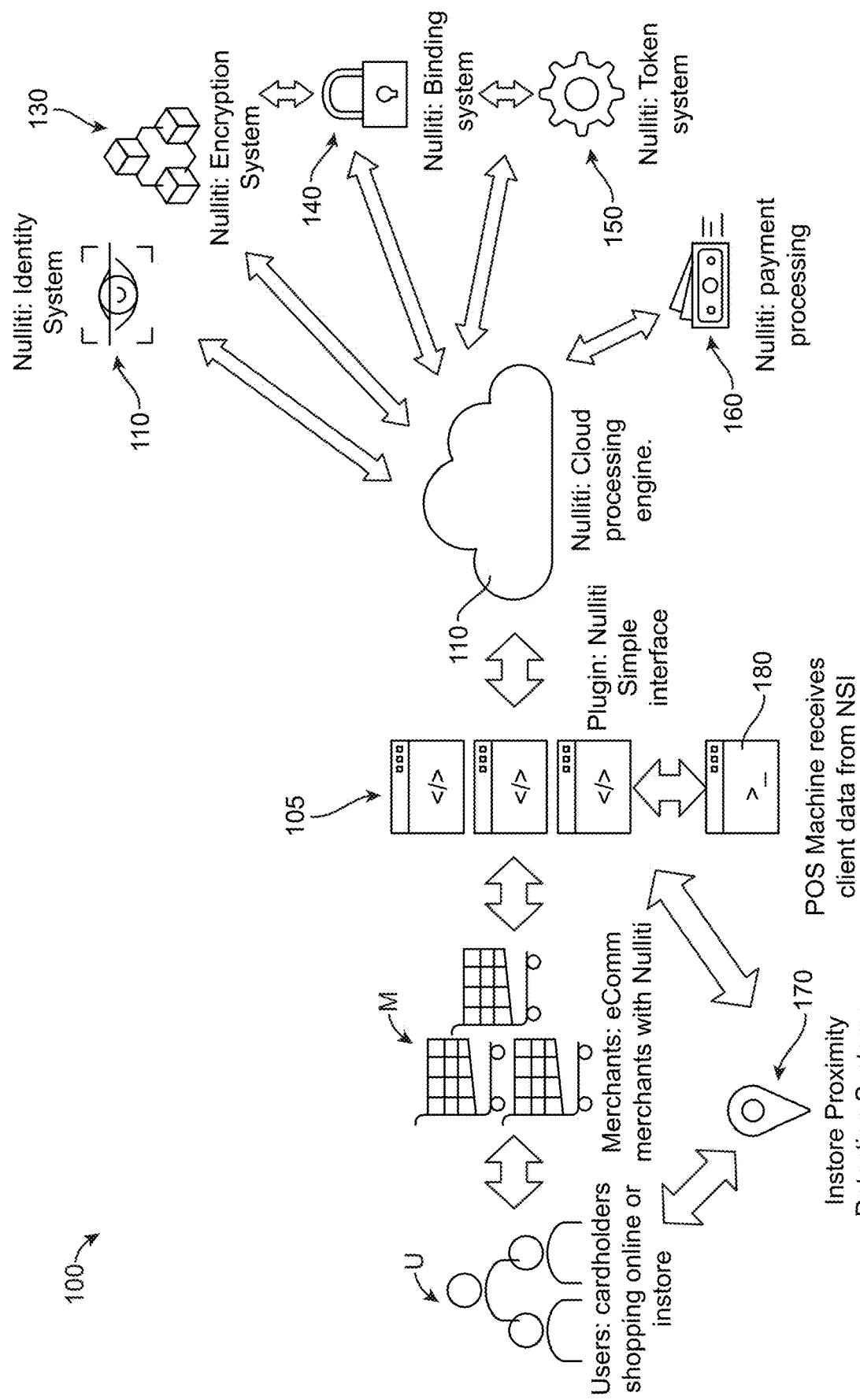
FIG. 1 is a schematic illustration of the present computer platform architecture.

Referring first to FIG. 1, the present system provides a computer system 100 in which a plurality of users or users/customers U interact with a plurality of merchants M to make secure online transactions. In preferred embodiments, computer system 100 comprises a cloud processing engine 110, an identity system 120, an encryption system 130, a cryptographic binding system 140, a token generator 150, and a payment processing system 160.

Each of system components 110, 120, 130, 140, 150 and 160 send and receive data from cloud processing engine 110, and cloud processing engine 110 coordinates the operation of each of the system components 110, 120, 130, 140, 150 and 160 to carry out the preferred methods of operation of the present system as described herein.

A user interface 105 is provided for the users U and merchants M to separately interact with cloud processing engine 110 to perform the present preferred methods. In accordance with preferred aspects of the invention, the cloud processing engine 110 and each of system components 110, 120, 130, 140, 150 and 160 may be partially or fully embodied in hardware or firmware comprising computer processors and memories or may be embodied as instructions in a non-transitory computer-readable medium comprising code and instructions for executing the preferred method steps, or both. Cloud processing engine 110 and each of system components 110, 120, 130, 140, 150 and 160 each preferably comprises processing devices and memory. Stored in the memories of these devices are instruction sets, algorithms, and code which when executed carry out the preferred method steps described herein. As such, the present invention encompasses physical systems with computer circuitry, processors, memory and networking components and computer-implemented methods and combinations thereof without limitation.

Figure 2:
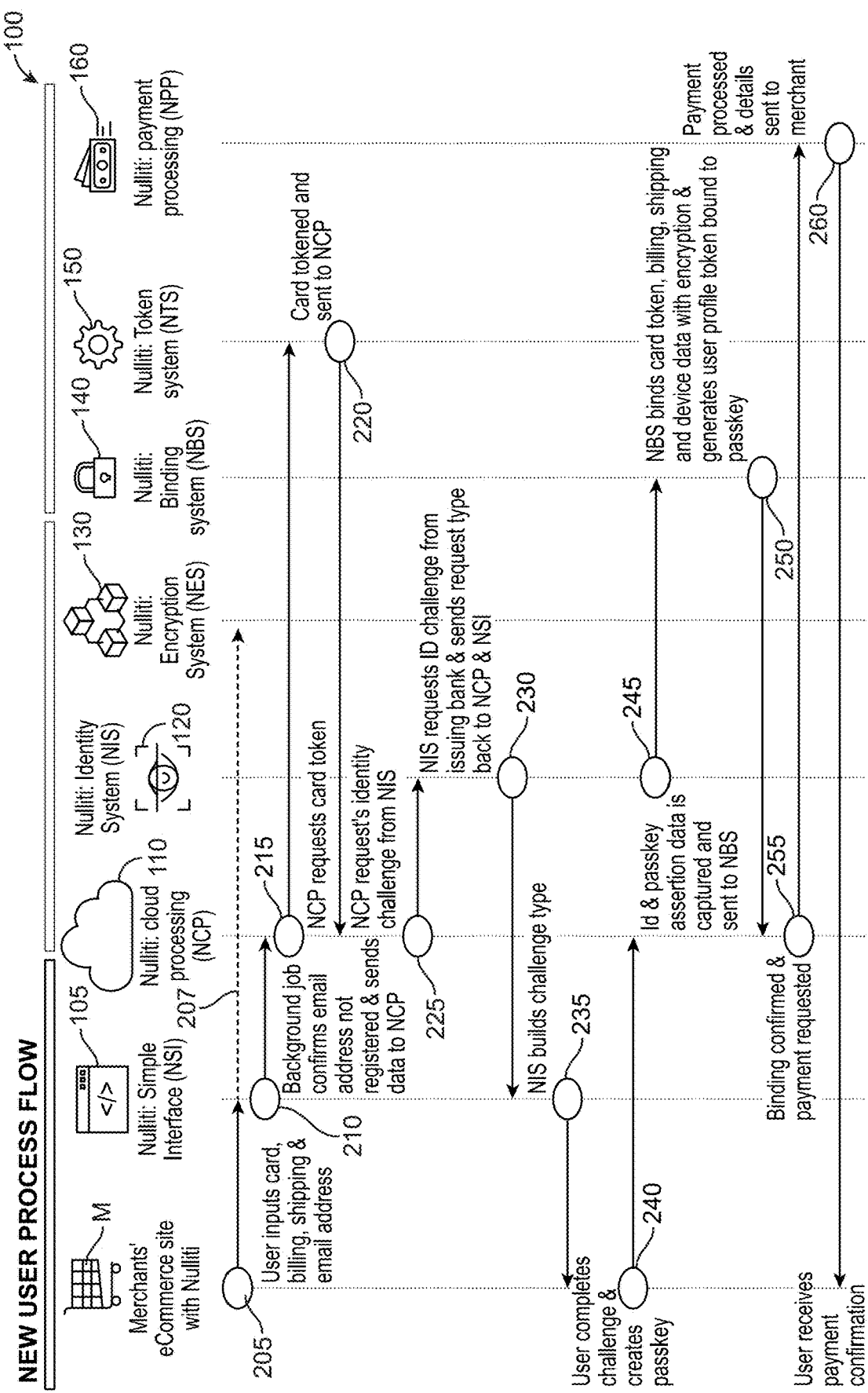
FIG. 2 is an illustration of the process steps taken when a new user interacts with the present system.

Referring next to FIG. 2, an illustration of the process steps taken when a new user interacts with the present system is provided. The order of steps is show in the process flow of FIG. 2, as follows. First, at step 205, the new user enters their credit card data into interface 105. This data may include credit card numbers, CVV codes and expiry dates. Also at step 205, the user may also enter their shipping and billing information (i.e.: delivery address and preferred method of transportation). Also at step 205, the user may enter their email address. In optional embodiments, the user may also enter other user-specific information, including but not limited to user preferences, purchasing history, etc.

User interface 105 may be hosted on a server, embedded or resident in merchant or user software and systems. User interface 105 may also be displayed on or resident in in store terminals, point of sale machines, cash registers, check out counters, hand-held mobile devices, APIs, etc. without limitation.

Figure 6:
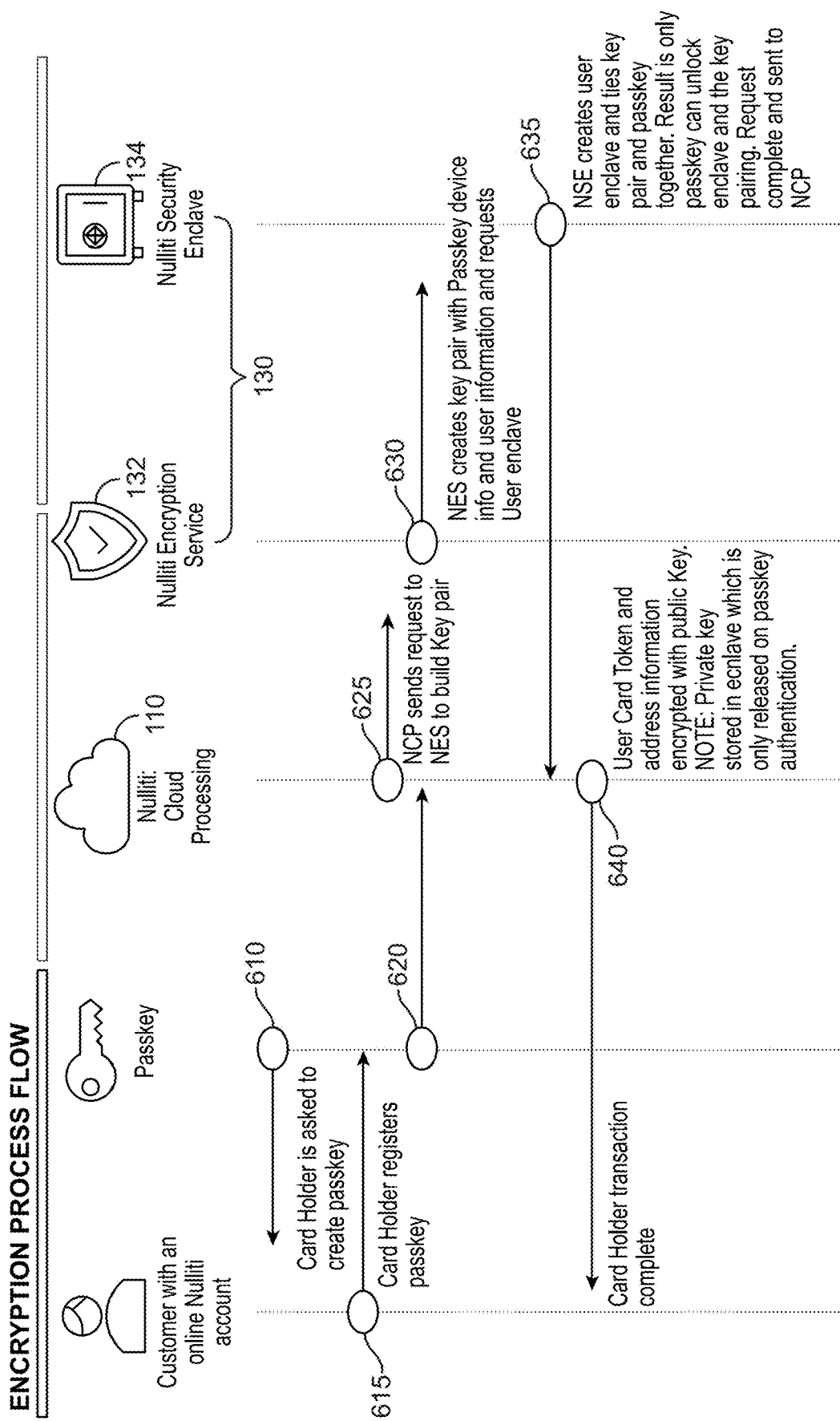
FIG. 6 is a flowchart of the method steps taken according to an embodiment of the present system for providing data encryption.

At optional step 207, this data be encrypted by encryption system 130 for added security. When this occurs, the present system can operate handling encrypted payment card data (as opposed to non-encrypted payment card data) from this point forwards. Further details of a preferred encryption system are illustrated in FIG. 6.

Next, at step 210, user interface 105 confirms that the credit, debit, gift, loyalty or other payment card information or user email address has not been seen before by the cloud processing system 110. Once user interface 105 has confirmed that a new user is interacting with the system, or a new payment card is being used, the new user or new user payment card or new user's information can be sent to cloud processing system 110.

Next, at step 215, the cloud processing system 110 will send the payment card information to token generator 150. Token generator 150 will then create a payment card token which will be returned to the cloud processing system 110 at step 220. In preferred aspects, the token(s) created will be tied to the session (e.g.: a payment session) and becomes invalid outside that session. The advantage of this approach to token creation is that intercepted tokens can't be reused on a different device (because they're specifically tied to the original device that created them). Without the proper device or token, a stolen token is useless. In preferred aspects, the tokens are hashed before being stored or transmitted. This ensures their integrity. For example, if someone attempts to modify a token, the hash generated from the modified data will not match the original hash, thereby signaling tampering. Optionally, a secondary identity verification (such as a text or email to the user) can be used when transferring tokens to a new device.

Next, at step 225, to further increase security, cloud processing system 110 may instruct identity system 120 to request an identity challenge from an issuing bank associated with the payment card data. At step 230, the approved results of the identity challenge from the issuing bank are sent to interface 105.

At step 235, interface 105 builds a passkey creation challenge for the user U. In preferred embodiments, the user generates their passkey using their biometric data or by using secure hardware data bound to the user's device. This biometric data may optionally include fingerprint or facial recognition data. At step 240, the user completes the passkey creation challenge, thereby creating a passkey which is sent back to cloud processing system 110. As such, the user generates the passkey by completing an identification challenge sent by the computer processing system 110. The user's created passkey is a private passkey portion, and the cloud processing system 110 retains a copy of the public passkey portion.

Next, at step 245, the user passkey data is captured and is sent to cryptographic binding system 140. Cryptographic binding system 140 then binds the payment token to the user's passkey. In optional embodiments, additional tokens (including but not limited to a shipping token representing shipping or billing data or a user-specific token representing user-specific information such as user preferences, loyalty program information and/or purchase histories) may also be cryptographically bound to the user's passkey. The tokens bound to the passkey may preferably use encrypted data. The advantage of generating and using a shipping token is that it is possible to perform transactions and process orders without exposing or storing the actual address information.

After the token(s) have been cryptographically bound to the user's passkey, the passkey with bound tokens can be sent to the cloud processing system 110 at step 250.

Next, cloud processing system 110 receives a payment request from a merchant M to complete the transaction. At this step, the user uses their passkey to unlock the tokens that have been cryptographically bound to their passkey. Next, at step 255, once the payment and optional shipping data has been unlocked by the user, cloud processing system 110 then sends the unlocked payment and shipping data to payment processing system 160. At step 260, payment is processed, the payment details are sent back to the merchant M and the user U is sent a confirmation of the transaction by email.

Figure 3:
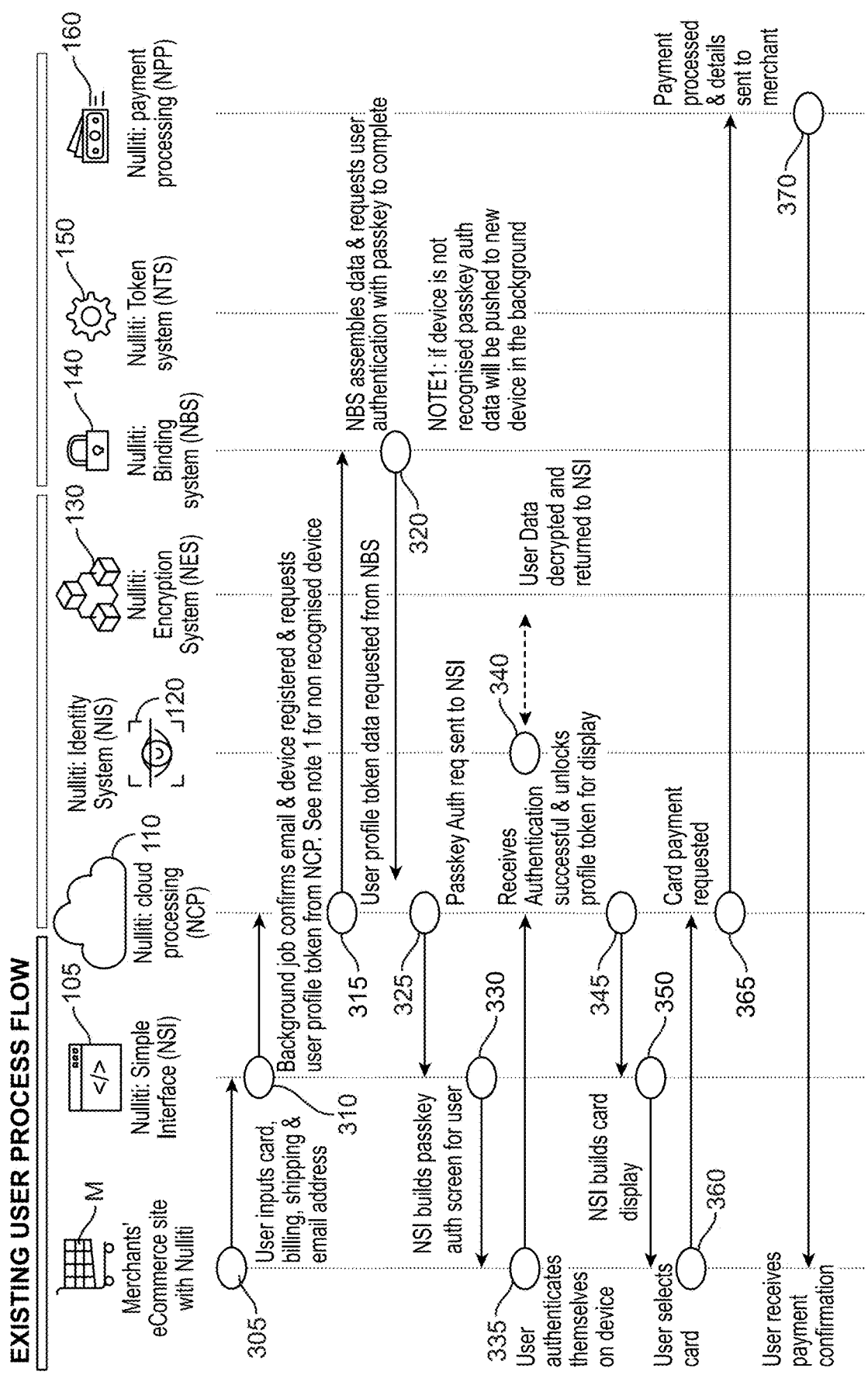
FIG. 3 is an illustration of the process steps taken when an existing user interacts with the present system.

FIG. 3 is similar to FIG. 2, but instead illustrates the situation where an existing user is interacting with the present system. In FIG. 3, the present system first recognizes the user and then proceeds directly to the transaction, as follows.

First, at step 305, the existing user enters their credit card data into interface 105. Similar to step 205 described above, this data may include credit card numbers, CVV codes and expiry dates. Also at step 305, the user may also enter their shipping and billing address information (i.e.: delivery address and preferred method of transportation). Also at step 305, the user may also enter their email address. In optional embodiments, the user may also enter other user-specific information, including but not limited to user preferences, purchasing history, etc. Next, at step 310, the user interface 105 will first confirm that the card information and email address entered has indeed been seen before by interface 105.

Since the computer processing system 100 has recognized the existing user, the system proceeds to step 315 where cloud processing system 110 request the token(s) from cryptographic binding system 140. Next, at step 320, the cryptographic binding system 140 sends a request to cloud processing system 110 for the user to provide their passkey to unlock the token(s) data. At step 325, the cloud processing system 110 forwards this request to interface 105. At step 330, user interface 105 builds a passkey authentication screen for the user U.

Next, at step 335, the user U authenticates themselves on their device/computer, and this authentication is sent to cloud processing system 110. At step 340, the user authentication is sent to the encryption system 130 and used to unlock the tokens that were cryptographically bound to the user's passkey. At step 345, the cloud processing system 110 instructs user interface 105 to build a payment card display with a network token. At step 350, interface 105 then builds the payment card display for the user.

Next, at step 360, the user selects their preferred payment card from a list of payment cards that they have previously stored in the present system. A request is then sent to cloud processing system 110 that the selected card be processed for payment. At step 365, once the payment and optional shipping and billing data has been unlocked by the user, cloud processing system 110 then sends the unlocked payment and shipping data to payment processing system 160. At step 370, payment is processed, the payment details are sent back to the merchant M and the user U is sent a confirmation of the transaction by email.

Figure 4:
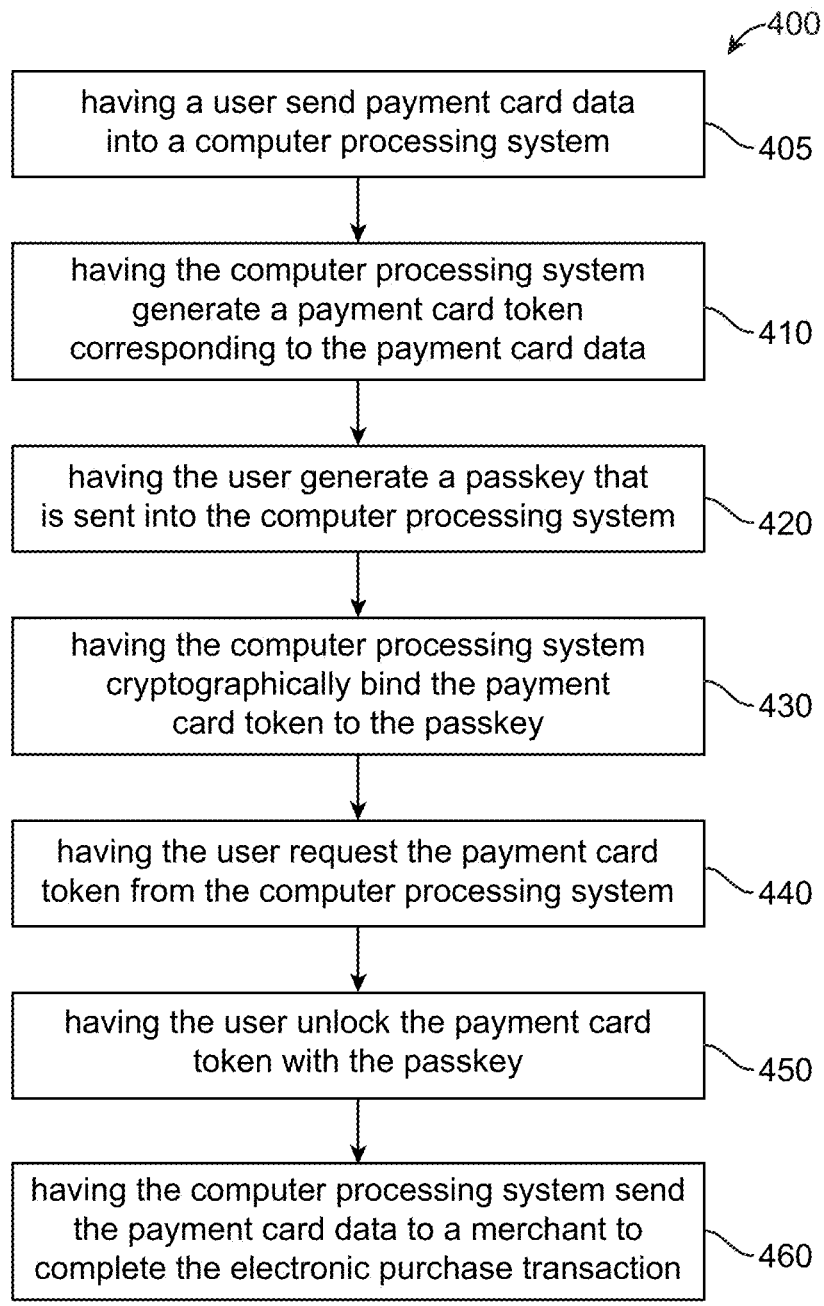
FIG. 4 is a flowchart of the method steps taken according to an embodiment of the present system.

FIG. 4 is a flowchart of the method steps taken according to an embodiment of the present system, as follows.

A method 400 of securely performing an electronic purchase transaction is provided, by first cryptographically binding a payment card token to a passkey by:
At 405, having a user send payment card data into computer processing system 100;
At 410, having computer processing system 100 generate a payment card token corresponding to the payment card data;
At 420, having the user generate a passkey that is sent to computer processing system;
At 40, having computer processing system 100 cryptographically bind the payment card token to the passkey.
After these steps have been completed, the electronic purchase transaction is completed by:
At 440, having the user request the payment card token from computer processing system 100;
At 450, having the user unlock the payment card token with the passkey; and then
At 460, having the computer processing system send the payment card data to a merchant to complete the electronic purchase transaction.

In those circumstances where the user is a pre-existing user whose information and payment details are previously known to the system, and stored in cloud processing engine 110 of computer processing system 110, the preferred method does not require the existing user to perform the previously described steps of creating a passkey and cryptographically binding the token(s) to the passkey can be skipped. Instead, the present system can proceed directly to steps 420, 425 and 430 with the user using their passkey to unlock the token(s) such that the payment card and shipping information can be used to complete the online transaction.

In optional embodiments of the preferred method, a shipping token corresponding to shipping data can also be created and this shipping token can also be cryptographically bound to the user's passkey. In addition, in optional embodiments of the preferred method, a user-specific token corresponding to user-specific information (such as user preferences, or loyalty program data) can also be cryptographically bound to the user's passkey. In accordance with preferred aspects of the method, these separate tokens may be cryptographically combined together into a composite token that is linked to the user passkey.

In further optional embodiments of the present system, a transaction token can be created by token generator 150. This transaction token can be bound to the passkey be token binding system 140. This transaction token may include data representative of the user's purchase history. As such, when the user unlocks the transaction token, their complete purchasing history can be revealed to them, as desired.

The present system offers several important advantages. A first is enhanced security. Specifically, even if the token was intercepted, it still can't be used without the correct passkey. Second is increased user privacy. Specifically, only the passkey holder can access the tokenized payment data. Third is cross-platform integrity. Specifically, tokenized data can only be used by the legitimate passkey holder, even when switching devices or operating systems. Fourth, the present system offers a substantially improved user experience. Fifth, a further advantage of the present system is that it can be integrated with digital wallets, E-Commerce platforms or Point Of Sale (POS) systems to enhance transaction security and improve security.

The advantage of using tokenized data (as opposed to the underlying data itself) in the transaction is added security. In optional aspects, the present system can also perform periodic identity checks of the user for maximum security. When the user updates their sensitive information (e.g.: their payment method or address), the tokens can be dynamically re-bound to the passkey to ensure that the token set remains secure and up to date.

In other optional preferred aspects, the present system includes a system for use at a point-of-sale location such as a retails store. In these optional aspects of the invention, a proximity detection system 170 is used to identify the user/customer, and a point-of-sale machine (such as a terminal or scanner) 180 can be used by a salesperson to record/identify the product that the user/customer wishes to purchase.

Figure 5:
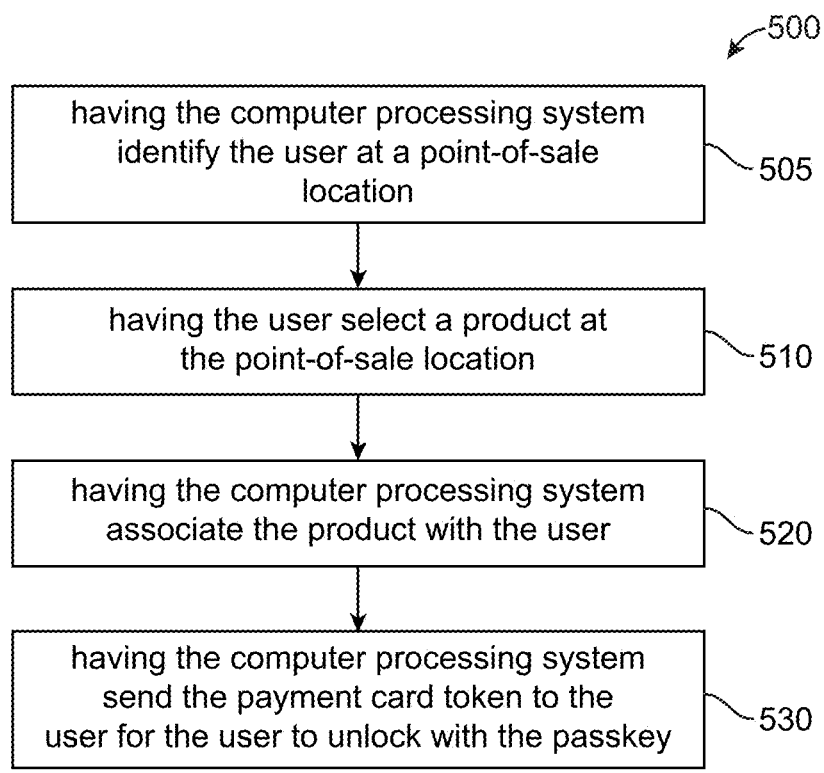
FIG. 5 is a flowchart of the method steps taken according to an embodiment of the present system used in a retail sales environment having a proximity detection system and a point-of-sale machine.

Reference is next made to FIG. 5 which shows, a flowchart of the method steps taken according to an embodiment of the present system used in a retail sales environment having a proximity detection system 170 and a point-of-sale machine 180.

In these preferred aspects, the step 500 of having the user request the payment token from the computer processing system is performed by:
(i) having the computer processing system identify the user at a point-of-sale location at 505,
(ii) having the user select a product at the point-of-sale location at 510,
(iii) having the computer processing system associate the product with the user at 520; and then
(iv) having the computer processing system send the payment card token to the user for the user to unlock with the passkey at 530.

Step 510 can be performed in two different ways. In a first approach the following occurs: (a) the user/customer presents the product to a salesperson, (b) the salesperson enters product information in a point-of-sale machine 180, and then (c) the point-of-sale machine 180 sends this product information to the computer processing system 110. In a second approach, the user himself/herself enters the product information in point-of-sale machine 180. The point-of-sale machine may optionally be a computer terminal, a cash register, a card payment terminal, a smartphone, a computer tablet, or a hand-held scanner.

At step 505, the computer processing system identifies the user at the point-of-sale location using proximity detection system 170 which may optionally be a GPS system, a Bluetooth beacon system, a Near Field Communication system, a WiFi system, etc. In optional embodiments, computer processing system 100 uses Artificial Intelligence, Machine Learning, or a Neural Network to confirm the identity of the user. For example, if multiple users/customers are detected in the retail store, the Artificial Intelligence, Machine Learning or Neural Network may optionally confirm the identity of the user by comparing the selected product with a user's purchase history. Other similar systems and methods are also contemplated, all keeping within the scope of the present invention. In the event that the computer processing system is unable to confirm the identity of the user, the identity of the user may optionally be confirmed by entering user ID information at a point-of-sale machine. A salesperson may enter this information or the user himself/herself may enter this information. Such user ID information may optionally comprise a QR code, a phone number, or an NFC tap at the point-of-sale machine. In preferred aspects, the computer processing system 100 sends the payment card token to a user's digital wallet for the user to unlock with the passkey.

In addition, computer processing system 100 may send both payment card data user Loyalty Program data to the merchant when performing the electronic purchase transaction.

In optional embodiments, the Artificial Intelligence system can use a mix of location, face and behavioral techniques to identify the user. For example, the user may be identified using one or more of the following AI systems:

(1) Location-Based Identification, including but not limited to: (a) GPS, Bluetooth beacons, or Wi-Fi signals to detect customer proximity and accurately assign transactions; (b) Machine learning algorithms that analyze location patterns and customer movement to refine detection accuracy; (c) Dynamic geofencing that allows the system to track entry and exit points, reducing false identifications and ensuring that only in-store customers are processed; or (d) the AI continuously updates customer profiles by learning habitual store visit times and typical transaction locations, enhancing predictive accuracy;

(2) Facial Recognition, including but not limited to: (a) employing advanced facial recognition techniques using cameras integrated into POS systems or store infrastructure; (b) Biometric data compared with customer records to confirm identity, enabling hands-free authentication; (c) Deep learning models that analyze facial features, accounting for variations in lighting, angle, and minor physical changes to improve match accuracy; and (d) AI cross-referencing facial recognition with location data to ensure a match between the physical presence and digital identity; and (3) Behavioral Biometrics, including but not limited to: (a) capturing and analyzing behavioral data, including typing speed, device handling patterns, and purchasing habits; (b) detecting anomalies and flagging potential fraudulent activities; (c) identifying unique user patterns such as grip pressure, swipe patterns, and gait detection to create individualized behavioral signatures; and (d) Continuous monitoring and learning refine behavioral models, improving fraud detection and reducing false positives over time; and (4) Adaptive Authentication, including but not limited to: (a) Based on real-time risk assessment, having the AI adjust the authentication process. For low-risk cases, a single biometric verification may suffice, while high-risk scenarios may trigger multi-factor verification; (b) having the AI evaluate contextual data like transaction value, frequency, and customer location to dynamically escalate authentication layers if needed; (c) having the system use anomaly detection to identify unusual behaviors, such as rapid successive purchases, prompting additional verification; and (d) using adaptive learning that allows the AI to recognize familiar patterns and reduce authentication friction for regular customers while maintaining security thresholds.

Lastly, FIG. 6 is a flowchart of the method steps taken according to an embodiment of the present system for providing data encryption using encryption system 130. In these aspects of the present system, data can be encrypted at step 207 described above such that the present system can operate handling encrypted payment card data (as opposed to non-encrypted payment card data) from that point forwards.

In accordance with these optional aspects of the present system encryption system 130 comprises an encryption service 132 and a security enclave 134. Encryption service 132 provides a robust and secure system for generating, encrypting, and managing cryptographic keys using encryption algorithms including RSA and AES encryption algorithms. Encryption service 132 may optionally generate a 2048-bit RSA key pair and encrypt the private key with AES-256-GCM, utilizing a derived key from a user's passphrase and salt through the PBKDF2 algorithm, which can be securely bound to the user's PassKey. This key pair can be managed and linked to the security enclave 134 which preferably comprises a dedicated, secure environment that binds the PassKey and key pair to the user's device(s), ensuring exclusive access for the passkey holder. In preferred aspects, encryption service 132 supports public key encryption and private key decryption using RSA with OAEP padding and SHA-256 hashing, enhancing both data confidentiality and integrity.

A preferred method of encryption is provided as follows. First, at step 610, the card holder is asked to create a passkey. At step 615, the card holder registers the passkey which at step 620 is transferred to cloud processing engine 110. Next, at step 625, this request is sent to encryption service 132 which, at step 630, creates a key pair with passkey device information and user information. A user enclave is requested from the security enclave 134. At step 635, the user enclave is created tying the key pair and passkey together. The result is that only the passkey can unlock the enclave and key pairing. This request is then complete, and is sent to the cloud processing engine 110. Finally, at step 640, the user card token and address information is encrypted with the public key. The private key is stored in security enclave 134 and is only released on passkey authentication. It is to be understood that this same preferred process may be used to encrypt the billing and shipping tokens, as desired.

What is claimed is:

1. A method of securely performing an electronic purchase transaction, comprising:
 (a) cryptographically binding a payment card token to a passkey by:
  having a user send payment card data into a computer processing system embodied in computer-readable media;

having the computer processing system generate a payment card token corresponding to the payment card data;

having the user send shipping and billing data to the computer processing system, having the computer processing system generate a shipping token corresponding to the billing and shipping data;

having the user generate a passkey that is sent into the computer processing system;

having the computer processing system cryptographically simultaneously bind both the payment card token and the shipping token to the passkey thereby increasing the speed and efficiency of the electronic purchase transaction by using one passkey for both the payment card token and the shipping token; and then (b) completing an electronic purchase transaction by:

having the user simultaneously request both the payment card token and the shipping token from the computer processing system during an online payment session that is tied to the online payment session on the user's device such that the payment card token and the shipping token both become invalid outside of the online payment session on the user's device;

in response to the user requesting both the payment card token and the shipping token, having the computer processing system identify the user at a point-of-sale location, wherein the computer processing system identifies the user by capturing device behavioral biometric data, wherein the behavioral biometric data includes at least one of a typing speed, grip pressure, and gait detection;

having the user simultaneously unlock both the payment card token and the shipping token with the passkey while the user is in the online payment session that is tied to the online payment session on the user's device; and then having the computer processing system send the payment card data and the shipping and billing data to a merchant to complete the electronic purchase transaction while the user is in the online payment session that is tied to the user's device, such that the step of the user requesting and unlocking both the payment card token and the shipping token and the step of the computer processing system sending the payment card data and the shipping and billing data to the merchant all occur when the user is in the same online payment session on the user's device, thereby increasing security of the user's payment card data and the shipping and billing data during the electronic purchase transaction while also increasing the speed and efficiency of the electronic purchase transaction; while also (c) processing existing system users' purchasing requests differently from new system users' purchasing requests as follows:

(i) having a user interface determine whether the user is a new system user or an existing system user by recognizing whether the payment card data and shipping and billing data entered by the user has been previously entered into the user interface, and then:

(ii) if the user is determined to be a new user, having the computer processing system simultaneously generate both the payment card token and the shipping token, or (ii) if the user is determined to be an existing user, having the computer processing system instead retrieve a pre-stored payment card token and a pre-stored shipping token, thereby avoiding a step of creating new tokens for existing users, thereby increasing the speed and efficiency of the electronic purchase transaction.

2. The method of claim 1, further comprising:
having the computer processing system:
request an identity challenge from an issuing bank associated with the payment card data, and then
receive approved results of the identity challenge from the issuing bank, prior to generating the payment card token.

3. The method of claim 1, further comprising:
having the user send user-specific data to the computer processing system,
having the computer processing system generate a user-specific token corresponding to the user-specific data;
having the computer processing system cryptographically bind the user-specific token to the passkey;
having the user unlock the user-specific token with the passkey; and then
having the computer processing system send the user-specific data to the merchant to complete the electronic purchase transaction.

4. The method of claim 3, wherein the user-specific data includes loyalty program data.

5. The method of claim 1, further comprising:
having the computer processing system store transaction history data,
having the computer processing system generate a transaction history token corresponding to the transaction history data;
having the computer processing system cryptographically bind the transaction history token to the passkey;
having the user unlock the transaction history token with the passkey; and then having the computer processing system send the transaction history data to the merchant to complete the electronic purchase transaction.

6. The method of claim 1, wherein the user generates the passkey by completing an identification challenge sent by the computer processing system.

7. The method of claim 1, wherein the user generates the passkey using biometric data or by using secure hardware data bound to the user's device.

8. The method of claim 1, wherein the computer processing system comprises:
an interface embodied in computer-readable media for receiving the user's payment card data;
a token generator embodied in computer-readable media for generating the payment card token corresponding to the payment card data;
a passkey generator embodied in computer-readable media for generating a request for passkey generation that is sent to the user such that the user responds to the request for passkey generation by generating the passkey;
a cryptographic binding system embodied in computer-readable media for cryptographically binding the payment card token to the passkey; and
a payment processing system embodied in computer-readable media for sending the payment card data to the merchant to complete the electronic purchase transaction during an online payment session that is tied to the user after the user has used the passkey to unlock the payment card data during the online payment session that is tied to the user; and a cloud processing engine embodied in computer-readable media for coordinating data transfer among the interface, the token generator, the passkey generator, the cryptographic binding system and the payment processing system.

9. The method of claim 8, wherein the computer processing system further comprises:
an identity system embodied in computer-readable media for requesting an identity challenge from an issuing bank associated with the payment card data prior to generating the payment card token; and
an encryption system embodied in computer-readable media for encrypting the payment card data prior to the token generator generating the payment card token.

10. The method of claim 1, wherein the step of having the user request the payment token from the computer processing system is performed by:
(i) having the computer processing system identify the user at a physical point-of-sale location,
(ii) having the user select a product at the physical point-of-sale location,
(iii) having the computer processing system associate the product with the user; and then
(iv) having the computer processing system send the payment card token to the user for the user to unlock with the passkey.

11. The method of claim 10, wherein having the user select a product at the point-of-sale location comprises:
the user presenting the product to a salesperson, or the user entering product information in a point-of-sale machine,
the salesperson entering product information in a point-of-sale machine or the user entering product information in a point-of-sale machine, and
the point-of-sale machine sending the product information to the computer processing system.

12. The method of claim 10, wherein the computer processing system identifies the user using a proximity detection system.

13. The method of claim 1, wherein the user generates the passkey using data that is tied to device handling patterns of the user's device.

14. The method of claim 1, wherein the payment card token is generated from encrypted payment card data.

15. The method of claim 14, wherein the encrypted payment card data is linked to a security enclave that binds a user's passkey to the user's device.

16. The method of claim 1, wherein the payment and shipping tokens are hashed before being stored or transmitted.

17. A computer platform for securely performing an electronic purchase transaction, comprising:
a cloud processing engine embodied in computer-readable media;
a user interface embodied in computer-readable media, the user interface being configured for a user to send payment card data and shipping and billing data to the cloud processing engine;
a token generator embodied in computer-readable media, the token generator being in communication with the cloud processing engine, wherein the token generator is configured for simultaneously generating a payment card token corresponding to the payment card data and a shipping token corresponding to the shipping and billing data;
a passkey generator embodied in computer-readable media, the passkey generator being in communication with the cloud processing engine, wherein the passkey generator is configured for generating a request for passkey generation that is sent to the user such that the user responds to the request for passkey generation by generating a passkey;
a cryptographic binding system embodied in computer-readable media, the cryptographic binding system being in communication with the cloud processing engine, wherein the cryptographic binding system is configured for simultaneously cryptographically binding the payment card token and the shipping token to the passkey; and
a payment processing system embodied in computer-readable media, the payment processing system being in communication with the cloud processing engine, wherein the payment processing system is configured for, in response to the user requesting both the payment card token and the shipping token, identifying the user at a point-of-sale location by capturing device behavioral biometric data, wherein the behavioral biometric data includes at least one of a typing speed, grip pressure, and gait detection;
wherein the payment processing system is configured for sending the payment card data to the merchant to complete the electronic purchase transaction during an online payment session that is tied to the user's online payment session such that the payment card token and the shipping token both become invalid outside of the online payment session on the user's device, after the user has requested the payment token during the online payment session that is tied to the user and used the passkey to unlock the payment card data in the payment card token during the online payment session that is tied to the user, and
wherein the cloud processing engine is configured to process existing system users' purchasing requests differently from new system users' purchasing requests by:
(i) having a user interface determine whether the user is a new system user or an existing system user by recognizing whether the payment card data and shipping and billing data entered by the user has been previously entered into the user interface, and then:
(ii) if the user is determined to be a new user, having the computer processing system simultaneously generate both the payment card token and the shipping token, or
(ii) if the user is determined to be an existing user, having the computer processing system instead retrieve a pre-stored payment card token and a pre-stored shipping token, thereby avoiding a step of creating new tokens for existing users, thereby increasing the speed and efficiency of the electronic purchase transaction.

18. The computer platform of claim 17, further comprising:
an identity system embodied in computer-readable media, the identity system being in communication with the cloud processing engine, wherein the identity system is configured for requesting an identity challenge from an issuing bank associated with the payment card data prior to generating the payment card token; and an encryption system embodied in computer-readable media, the encryption system being in communication with the cloud processing engine, wherein the encryption system is configured for encrypting the payment card data prior to the token generator generating the payment card token.

19. The computer platform of claim 17, wherein the cloud processing center is configured to determine if the payment card data and the payment card token has previously been stored therein, and if the payment card data and the payment card token has previously been stored therein, to then instruct the payment processing system to complete the electronic purchase transaction after the user has used the passkey to unlock the payment card data in the payment card token.

20. The computer platform of claim 17, further comprising:

a user identifying proximity detection system for identifying the user at a physical point-of-sale location, and a point-of-sale machine where the user presents the product to a salesperson who identifies the product on the point-of-sale machine.

21. The computer platform of claim 20, wherein the proximity detection system is one of a GPS system, a Bluetooth beacon system, a Near Field Communication system or a WiFi system.

* * * * *